(12) United States Patent
Bayer

(10) Patent No.: US 10,428,199 B2
(45) Date of Patent: Oct. 1, 2019

(54) POLYESTER-ETHER RESIN BLENDS

(71) Applicant: Trevira Holdings GMBH, Bobingen (DE)

(72) Inventor: Uwe Bayer, Gessertshausen (DE)

(73) Assignee: Trevira Holdings GMBH (DE)

( * ) Notice: Subject to any disclaimer, the term of this patent is extended or adjusted under 35 U.S.C. 154(b) by 0 days.

(21) Appl. No.: 15/506,547

(22) PCT Filed: Aug. 4, 2015

(86) PCT No.: PCT/US2015/043595
§ 371 (c)(1),
(2) Date: Feb. 24, 2017

(87) PCT Pub. No.: WO2016/022550
PCT Pub. Date: Feb. 11, 2016

(65) Prior Publication Data
US 2017/0233547 A1  Aug. 17, 2017

(30) Foreign Application Priority Data
Aug. 5, 2014  (EP) .................................... 14179890

(51) Int. Cl.
*C08K 5/098* (2006.01)
*C08L 67/02* (2006.01)
*C08J 3/22* (2006.01)

(52) U.S. Cl.
CPC ................. *C08K 5/098* (2013.01); *C08J 3/22* (2013.01); *C08L 67/02* (2013.01); *C08J 2367/02* (2013.01)

(58) Field of Classification Search
CPC ........ C08K 5/098; C08L 67/025; C08G 63/66
See application file for complete search history.

(56) References Cited

U.S. PATENT DOCUMENTS

| 4,440,924 A * | 4/1984 | Kuze ...................... | C08G 63/87 528/274 |
| 5,623,047 A * | 4/1997 | Yuo ........................ | C08G 63/78 502/153 |
| 2010/0305296 A1* | 12/2010 | Qi .......................... | C08G 63/85 528/279 |
| 2011/0008554 A1* | 1/2011 | Chen ....................... | C08L 67/02 428/35.2 |

* cited by examiner

*Primary Examiner* — Robert C Boyle
(74) *Attorney, Agent, or Firm* — Seth L. Hudson; Clements Bernard Walker PLLC

(57) ABSTRACT

The present disclosure relates to masterbatch compositions used for preparing articles, preforms or containers comprising a base polyester, a transition metal-based oxidation catalyst, an alkali metal compound, and an alkaline earth metal compound. The masterbatch compositions have desirable viscosity characteristics and the prepared articles, preforms or containers using these masterbatch compositions have desirable mechanical, visual and gas barrier properties.

15 Claims, No Drawings

POLYESTER-ETHER RESIN BLENDS

CROSS-REFERENCE TO RELATED APPLICATIONS

This application claims the priority filing date of European Patent Application serial number 14179890.0, filed Aug. 5, 2014, the disclosures of which are specifically incorporated herein by reference in their entireties.

FIELD

The present disclosure relates to novel polyester-ether resin composition comprising a masterbatch concentrate containing at least a polyethylene terephthalate polymer and alkali metals. These resin compositions show improved IV and oxygen barrier properties, and are useful in the manufacture of polyester articles, preforms and containers.

BACKGROUND

Polyesters have been replacing glass and metal packaging materials due to their lighter weight, decreased breakage compared to glass, and potentially lower cost. One major deficiency with standard polyesters, however, is its relatively high gas permeability. This curtails the shelf life of carbonated soft thinks and oxygen sensitive beverages or foodstuffs such as beer, wine, tea, fruit juice, ketchup, cheese and the like. Organic oxygen scavenging materials have been developed partly in response to the food industry's goal of having longer shelf-life for packaged food. These oxygen scavenging materials are incorporated into at least a portion of the package and remove oxygen from the enclosed package volume which surrounds the product or which may leak into the package, thereby inhibiting spoilage and prolonging freshness.

Suitable oxygen scavenging materials include oxidizable organic polymers which may react with ingressing oxygen. One example of an oxidizable organic polymer is a polyether. The polyether is typically used as a polyester-ether copolymer and in low amounts of less than 10 weight percent of the packaging material. The polyester-ether is dispersed in the matrix polyester phase and interacts with a suitable oxygen scavenging catalyst that catalyzes the reaction of the ingressing oxygen with the polyether, Oxygen scavenging catalysts are typically transition metal compounds, for example an organic or inorganic salt of cobalt. Other examples include manganese, copper, chromium, zinc, iron and nickel.

To reduce the oxygen ingress into the filled contents of the container, small amounts of transition metal salts, such as cobalt salts, may be added to the resin composition. However, such additions, if not careful, may also impart coloration and haze to the container. Therefore, it is often desirable to minimize the amount of metal based oxygen scavenging catalysts.

Another problem with the addition of transition metal salts, cobalt salts in particular, is that the residual moisture content of the salts is sufficiently high. It is difficult to completely dry out these salts. The presence of water molecules is undesirable during a late addition (adding after the finisher) step or during a compounding step. It may be possible to add the transition metal salts, such as cobalt salts, at the beginning of the polycondensation reaction, wherein the molecular weight is still low and any moisture content could be handled during the process. However, in this case, the added transition metal, cobalt for example, precipitates which contribute to haziness during articles formation. Also, the added transition metal could catalyze the depolymerization reaction and other unwanted decomposition reactions.

It is a common industrial problem that the water content causes the an inferior viscosity characteristics, low intrinsic viscosity (IV) in particular. Low intrinsic viscosity translates to low molecular weight. The low-molecular weight polymer compositions are not effective in compounding resins for container manufacturing. Articles, bottles and containers prepared using low-molecular weight resins show inferior mechanical properties.

The present disclosure relates to solving this problem of low molecular weight resins by using a particular combination of alkali metal and alkaline earth metal salts with the cobalt salts used.

In the preparation of polymers by a compounding step, the intrinsic viscosity (IV) of the end product is of practical importance. There may be equipment limitations such as strand granulation due to a too low IV. It is desirable to achieve the end product IV as high as possible given process equipment limitations.

The present disclosure makes it possible to achieve the IV target of end product of at least 0.40 dL/g.

SUMMARY

It is now found that the introduction of a combination of alkali metal and alkaline earth metal compounds into the polymer resin is effective for producing compositions with suitable viscosity and gas barrier properties for container manufacturing when the resin further comprises a traditional transition metal-based oxidation catalyst such as a cobalt compound.

One aspect of the present disclosure is directed to a masterbatch composition for blow-molding articles comprising:
  a) ≥80-99.5 parts by weight of polyester;
  b) a transition metal-based oxidation catalyst, wherein the transition metal is selected from the group consisting of cobalt, manganese, copper, chromium, zinc, iron or nickel, and wherein the transition metal based oxidation catalyst is present in an amount of ≥5-≤20000 ppm, on basis of the weight of the transition metal in the masterbatch composition;
  c) an alkali metal compound, and
  d) an alkaline earth metal compound;
wherein the weight ratio of the transition metal-based oxidation catalyst to the alkaline earth metal compound, on basis of the weight of the transition metal and the alkaline earth metal, is from ≤50:1 to 1:≤50, and the weight ratio of the alkali metal compound to the alkaline earth metal compound, on basis of the weight of the alkali metal and the alkaline earth metal, is from ≤20:1 to 1:≤20.

Another aspect of the present disclosure is directed to the masterbatch composition, wherein the alkaline earth metal compound d) is selected from the group consisting of beryllium (Be), magnesium (Mg), calcium (Ca), strontium (Sr), barium (Ba) or radium (Ra), and wherein the weight ratio of the transition metal-based oxidation catalyst to the alkaline earth metal compound, on basis of the weight of the transition metal and the alkaline earth metal, is from ≤50:1 to 1:≤50.

In one aspect of the present disclosure, the amount of alkaline earth metal in the total composition is less than the amount of the transition metal of the transition metal based oxidation catalyst in the masterbatch composition.

Another aspect of the present disclosure is directed to the masterbatch composition wherein the alkaline earth metal compound is selected from alkaline earth metal carboxylates, in particular $C_1$-$C_{18}$-carboxylates or $C_8$-$C_{18}$-carboxylates.

Another aspect of the present disclosure is directed to the masterbatch composition, wherein the alkali metal compound c) is selected from the group consisting of lithium (Li), sodium (Na), potassium (K), rubidium (Rb), cesium (Cs) or francium (Fr), and wherein the weight ratio of the alkali metal compound to the alkaline earth metal compound, on basis of the weight of the alkali metal and the alkaline earth metal, is from ≤20:1 to 1:≤20.

In one aspect of the present disclosure, the alkali metal compound is selected from alkali metal carboxylates, in particular $C_1$-$C_{18}$-carboxylates or $C_8$-$C_{18}$-carboxylates.

Another aspect of the present disclosure is directed to a method of preparing a masterbatch composition for use in blow-molding polyester articles comprising mixing:

1) a polyester;
2) a transition metal-based oxidation catalyst, wherein the oxidation catalyst metal is present in an amount of ≥5-≤20000 ppm, on basis of the weight of the transition metal in the masterbatch composition, wherein the transition metal is selected from the group consisting of cobalt, manganese, copper, chromium, zinc, iron or nickel; and
3) an alkali metal compound, and
4) an alkaline earth metal compound, wherein the weight ratio of the transition metal-based oxidation catalyst to the alkaline earth metal compound, on basis of the weight of the transition metal and the alkaline earth metal, is from ≤50:1 to 1:≤50, wherein the alkaline earth metal compound is present in an amount of ≥100 to ≤10000 ppm, on basis of the weight of the alkaline earth metal in the masterbatch composition, and wherein the weight ratio of the alkali metal compound to the alkaline earth metal compound, on basis of the weight of the alkali metal and the alkaline earth metal, is from ≤20:1 to 1:≤20, wherein the alkali metal compound is present in an amount of ≥100 to ≤10000 ppm, on basis of the weight of the alkali metal in the masterbatch composition.

DETAILED DESCRIPTION

The following detailed description of components is applicable to all of the above-mentioned aspects of the present disclosure. In addition, individual elements of the detailed description are intended to be freely combinable with the above various aspects of the disclosure.

Embodiments of the invention described and claimed herein are not to be limited in scope by the specific embodiments herein disclosed, since these embodiments are intended as illustration of several aspects of the disclosure. Any equivalent embodiments are intended to be within the scope of this disclosure. Indeed, various modifications of the embodiments in addition to those shown and described herein will become apparent to those skilled in the art from the foregoing description. Such modifications are also intended to fall within the scope of the appended claims.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein. In addition, where features or aspects of the invention are described in terms of Markush groups, those skilled in the art will recognize that the invention is also thereby described in terms of any individual member or subgroup of members of the Markush group.

As used herein and in the appended claims, the singular forms "a," "an," and "the" include plural reference unless the context clearly dictates otherwise. Thus, for example, a reference to processing or making a "polymer", a "preform", "article", "container", "concentrate", "masterbatch" or "bottle" include the processing or making of a plurality of polymers, preforms, articles, containers, concentrates, masterbatchs or bottles. References to a composition containing "an" ingredient or "a" polymer include other ingredients or other polymers, respectively, in addition to the one named. In this document, the term "or" is used to refer to a nonexclusive or, such that "A or B" includes "A but not B," "B but not A," and "A and B," unless otherwise indicated.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The intrinsic viscosity, abbreviated as "IV", values described throughout this disclosure have the measurement unit of deciliters per gram (dL/g). One deciliter is 100 ml or 100 $cm^3$.

The term "about" as used herein can allow for a degree of variability in a value or range, for example, within 10%, within 5%, or within 1% of a stated value or of a stated limit of a range.

The term "masterbatch", as used herein, means a concentrated additive portion prepared and used in starting polymeric materials to impart certain appearance and/or performance enhancing properties to articles manufactured from polymeric resins. A typical masterbatch is a concentrated mixture of additive compounds introduced during a heat process into a polymer resin which is then cooled and cut into a granular shaped pellets. The polymer resin pellets are then thermally stretch-blown into preforms, articles or containers of desired shapes.

The term "transition metal", as used in the present disclosure, means any of the set of metallic elements occupying Groups IVB-VIII, IB, and JIB, or 4-12 in the periodic table of elements. Non-limiting examples are cobalt (Co), manganese (Mn), copper (Cu), chromium (Cr), zinc (Zn), iron (Fe), nickel (Ni), and combinations thereof. The transition metals have variable chemical valence and a strong tendency to form coordination compounds.

The term "metal", as used in the present disclosure, means the metal in any oxidation state. Examples of metal include metal added to or at least a portion of which is present in the +2 or +3 oxidation state in the composition, or metal in the 0 oxidation state as elemental metal.

The term "alkali metal", as used herein means any of the set of chemical elements occupying Group 1 of the periodic table of elements. Non-limiting examples are lithium (Li), sodium (Na), potassium (K), rubidium (Rb), cesium (Cs), francium (Fr) and combinations thereof.

The term "alkaline earth metal", as used herein means any of the set of chemical elements occupying Group 2 of the periodic table of elements. Non-limiting examples of the alkaline earth metals include beryllium (Be), magnesium (Mg), calcium (Ca), strontium (Sr), barium (Ba), radium (Ra), and combinations thereof.

As used herein, the term "base polyester" refers to a polyester component which is the predominant component of the total composition, e.g., used in excess of 50 wt % of the total composition, in particular in excess of 80 wt %, and more specifically in excess of 90 wt %.

The term "ppm" or parts per million, as used herein means a component concentration of 1 milligram/kilogram (mg/kg). For example, a particular metal concentration of 100 ppm means that 100 mg of that particular metal is present in 1 kg of total composition. 1 ppm concentration equals 1 mg/kg concentration relative to the total composition.

All publications, including non-patent literature (e.g., scientific journal articles), patent application publications, and patents mentioned in this specification are incorporated by reference as if each were specifically and individually indicated to be incorporated by reference.

It is understood that the descriptions herein are intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," "third," and the like are used merely as labels, and are not intended to impose numerical requirements on their objects.

One aspect of the present disclosure is directed to a masterbatch composition for blow-molding articles comprising:
a) ≥80-≤99.5 parts by weight of polyester;
b) a transition metal-based oxidation catalyst, wherein the transition metal is selected from the group consisting of cobalt, manganese, copper, chromium, zinc, iron or nickel, and wherein the transition metal based oxidation catalyst is present in an amount of ≥5-≤20000 ppm, on basis of the weight of the transition metal in the masterbatch composition;
c) an alkali metal compound, and
d) an alkaline earth metal compound;
wherein the weight ratio of the transition metal-based oxidation catalyst to the alkaline earth metal compound, on basis of the weight of the transition metal and the alkaline earth metal, is from ≤50:1 to 1:≤50, and the weight ratio of the alkali metal compound to the alkaline earth metal compound, on basis of the weight of the alkali metal and the alkaline earth metal, is from ≤20:1 to 1:≤20.

It is now found that the introduction of a combination of alkali metal and alkaline earth metal compounds into the masterbatch is effective for producing resin compositions with suitable IV, visual appearance and gas barrier properties for container manufacturing when the resin further comprises a traditional transition metal-based oxidation catalyst such as a cobalt compound.

In some embodiments, the masterbatch composition may also include one or more post-transition metals, such as aluminum (Al), gallium (Ga), indium (In), titanium (Ti), tin (Sn), antimony (Sb), and combinations thereof. In other embodiments, the masterbatch composition may also include one or more non-metallic components, such as phosphorus (P).

It is surprising and unexpected since the very same alkaline earth metal, such as magnesium or calcium, present in the masterbatch composition provides only poor container properties on its own. Such polyester resins are particularly suitable for making articles, preforms and containers with acceptable visual appearance.

In some embodiments, resin compositions may comprise a copolyester-ether, and a monomeric, oligomeric or polymeric hindered amine light stabilizer (HALS) wherein the HALS is represented by the formula (I) or a mixture of compounds of formula (I),

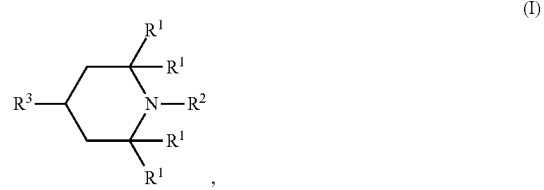

(I)

wherein each $R^1$ independently represents $C_1$-$C_4$ alkyl, $R^2$ represents H, $C_1$-$C_4$ alkyl, OH, O—$C_1$-$C_4$ alkyl, or a further part of an oligomeric or polymeric HALS, and $R^3$ represents a further part of a monomeric, oligomeric or polymeric HALS.

In some embodiments, the HALS may be a polymeric HALS wherein $R^3$ in above formula (I) may represent the polymer backbone of the polymeric HALS, such as Uvinul® 5050 for example. In other embodiments, $R^2$ in above formula (I) may represent a further part of an oligomeric or polymeric HALS, the piperidine ring in above formula (I) is part of the repeat unit of the oligomeric or polymeric HALS, such as Uvinul® 5062. In some other embodiments, the HALS may be a mixture of compounds of above formula (I), such as Uvinul® 4092. Other suitable HALSs include but are not limited to Uvinul® 4077, Uvinul® 4092, Nylostab®, Tinuvin®, Hostavin® and Nylostab® S-EED®.

In some embodiments, the HALS may be a monomeric HALS or a mixture there of. In other embodiments, the HALS may have a molecular weight of about 200 g/mol or above, about 400 g/mol or above or about 200 to about 5000 g/mol, or about 400 to about 4000 g/mol, or in particular about 600 to about 2500 g/mol. An example of such a HALS is Uvinul® 4050.

In some embodiments of the present disclosure, the HALS may be used in an amount of about ≥15 to about ≤20,000 ppm, or about ≥20 to about ≤15,000 ppm, or about ≥50 to about ≤10,000 ppm, respective to the weight of the total composition used in the preform.

In some embodiments, the resin composition further comprises an antioxidant.

Suitable examples of antioxidants include, but are not limited to, phenolic antioxidants, aminic antioxidants, sulfur-based antioxidants and phosphites, and mixtures thereof. Non-limiting examples of antioxidants are described in a published journal article titled "Antioxidants for poly(ethylene terephthalate)" in Plastics Additives, Pritchard, G., Ed. Springer Netherlands: 1998; Vol. 1, pp 95-107.

In some embodiments, the copolyester-ether may comprise of an antioxidant in an amount of up to about ≤3000 ppm by weight, in particular up to about ≤2000 ppm by weight, more specifically up to about ≤1000 ppm by weight, relative to the total copolyester-ether weight. Non-limiting examples of such antioxidants include butylated hydroxytoluene (BHT), Ethanox® 330, Ethanox® 330G, IRGANOX 1330, Hostanox® PEP-Q, and mixtures thereof.

In some embodiments, the antioxidant may be selected from the group consisting of hindered phenols, sulfur-based antioxidants, hindered amine light stabilizers and phosphites. In a further embodiment, the antioxidant may be selected from the group consisting of hindered phenols, sulfur-based antioxidants and phosphites. Examples of such antioxidants include, but are not limited to 1,3,5-trimethyl-2,4,6-tris(3,5-di-tert-butyl-4-hydroxybenzyl)-benzene (CAS: 1709-70-2), tetrakis(2,4-di-tert-butylphenyl)-1,1-biphenyl-4,4'-diylbisphosphonite (CAS: 38613-77-3) or pentaerythritol tetrakis(3-(3,5-di-tert-butyl-4-hydroxyphenyl)propionate (CAS: 6683-19-8), (5R)-[(1S)-1,2-Dihydroxyethyl]-3,4-dihydroxyfuran-2(5H)-one (Ascorbic acid CAS: 50-81-7); α-tocopherol (vitamin E form antioxidant agent. CAS: 59-02-9).

In certain embodiments, the antioxidant is a hindered phenol. In a further embodiment, the antioxidant is

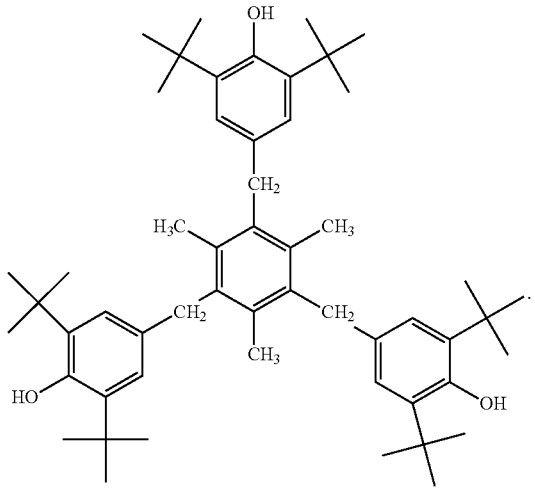 [SMILES: Cc1c(Cc2cc(C(C)(C)C)c(O)c(C(C)(C)C)c2)c(C)c(Cc2cc(C(C)(C)C)c(O)c(C(C)(C)C)c2)c(C)c1Cc1cc(C(C)(C)C)c(O)c(C(C)(C)C)c1]

Generally, polyesters suitable for the present disclosure can be prepared by processes, namely, and not limited to (I) the ester process and (2) the acid process. The ester process is where a dicarboxylic ester (such as dimethyl terephthalate) is reacted with ethylene glycol or other diol in an ester interchange reaction. Catalysts for use in the ester interchange reaction are well known and may be selected from zinc, cobalt, titanium, calcium, magnesium or lithium compounds. Because the reaction is reversible, it is generally necessary to remove the alcohol (e.g. methanol when dimethyl terephthalate is employed) to completely convert the raw materials into monomers. The catalytic activity of the interchange reaction catalyst may optionally be sequestered by introducing a phosphorus compound, for example polyphosphoric acid, at the end of the ester interchange reaction. Then the monomer undergoes polycondensation. The catalyst employed in this reaction is typically antimony, germanium, aluminum, zinc, tin or titanium compound, or a mixture of these. In some embodiments, it may be advantageous to use a titanium compound.

In the second method for making polyester, an acid (such as terephthalic acid) is reacted with a diol (such as ethylene glycol) by a direct esterification reaction producing monomer and water. This reaction is also reversible like the ester process and thus to drive the reaction to completion one must remove the water. The direct esterification step does not require a catalyst. The monomer then undergoes polycondensation to form polyester just as in the ester process, and the catalyst and conditions employed are generally the same as those for the ester process. In summary, in the ester process there are two steps, namely: (1) an ester interchange, and (2) polycondensation. In the acid process there are also two steps, namely: (1) direct esterification, and (2) polycondensation.

Suitable polyesters can be aromatic or aliphatic polyesters, and are preferably selected from aromatic polyesters. An aromatic polyester is preferably derived from one or more diol(s) and one or more aromatic dicarboxylic acid(s). The aromatic dicarboxylic acid includes, for example, terephthalic acid, isophthalic acid, 1,4-, 2,5-, 2,6- or 2,7-naphthalenedicarboxylic acid and 4,4'-diphenyldicarboxylic acid (and of these terephthalic acid is preferred). The diol is preferably selected from aliphatic and cycloaliphatic diol(s), including, for example, ethylene glycol, 1,4-butanediol, 1,4-cyclohexane dimethanol, and 1,6-hexanediol (and of these, aliphatic diols, and preferably ethylene glycol, is preferred). Preferred polyesters are polyethylene terephthalate (PET) and polyethylene-2,6-naphthalene dicarboxylate (also referred to herein as polyethylene-2,6-naphthalate), and particularly preferred is PET.

Examples of suitable polyesters include those produced from the reaction of a diacid or diester component comprising at ≥ least 65 mol % aromatic diacid (preferably terephthalic acid) or the $C_1$-$C_4$ dialkyl ester of the aromatic acid (preferably $C_1$-$C_4$ dialkylterephthalate), for example at least ≥70 mol % or at least ≥75 mol % or at least 95 mol %, with a diol component comprising at least ≥65 mol % diol (preferably ethylene glycol), for example at least ≥70 mol % or at least ≥75 mol % or at least ≥95 mol %. Exemplary polyesters include those wherein the diacid component is terephthalic acid and the diol component is ethylene glycol, thereby forming polyethylene terephthalate (PET). The mole percent for all the diacid components totals 100 mol %, and the mole percentage for all the diol components totals 100 mol %.

The polyester may be modified by one or more diol components other than ethylene glycol. In this case, the polyester is a copolyester. Suitable diol components of the described polyester may be selected from 1,4-cyclohexane-dimethanol, 1,2-propanediol, 1,4-butanediol, 2,2-dimethyl-1,3-propanediol, 2-methyl-1,3-propanediol (2MPDO) 1,6-hexanediol, 1,2-cyclo-hexanediol, 1,4-cyclohexanediol, 1,2-cyclohexanedimethanol, 1,3-cyclohexanedimethanol, and diols containing one or more oxygen atoms in the chain, e.g., diethylene glycol, triethylene glycol, dipropylene glycol, tripropylene glycol or mixtures of these, and the like. In general, these diols contain 2 to 18, preferably 2 to 8 carbon atoms. Cycloaliphatic diols can be employed in their cis- or trans-configuration or as mixture of both forms. Suitable modifying diol components can be 1,4-cyclohexanedimethanol or diethylene glycol, or a mixture of these.

The polyester may be modified by one or more acid components other than terephthalic acid. In this case, the polyester is a copolyester. Suitable acid components (aliphatic, alicyclic, or aromatic dicarboxylic acids) of the linear polyester may be selected, for example, from isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalene-dicarboxylic acid, bibenzoic acid, or mixtures of these and the like. In the polymer preparation, it is possible to use a functional acid derivative of the above acid components. Typical functional acid derivatives include the dimethyl, diethyl, or dipropyl ester of the dicarboxylic acid or its anhydride.

In some embodiments, the polyester is a copolyester of ethylene glycol with a combination of terephthalic acid and isophthalic acid and/or metal salt of 5-sulfoisophthalic acid. In other embodiments, the isophthalic acid can be present from about ≥0.05 mol % to about ≤10 mol % and the metal salt of 5-sulfoisophthalic acid can be present from about ≥0.1 mol % to about ≤3 mol % of the copolymer. The metal in the 5-sulfoisophthalic acid metal salt may be lithium, sodium, potassium, zinc, magnesium and calcium, as described in U.S Patent Application No. 20130053593 A1, incorporated herein by reference.

In some embodiments, the polyester may be selected from polyethylene terephthalate, polyethylene naphthalate, polyethylene isophthalate, copolymers of polyethylene terephthalate, copolymers of polyethylene naphthalate, copolymers of polyethylene isophthalate, or mixtures thereof; for example the polyester can be a copolymer of polyethylene terephthalate, such as poly(ethylene terephthalate-co-ethylene isophthalate) or poly(ethylene terephthalate-co-ethylene 5-sulfoisophthalate) or poly(ethylene terephthalate-co-ethylene isophthalate-co ethylene 5-sulfoisophatnalte metal salt).

The composition for preparing an article, preform or container comprises ≥80-≤99.5 parts by weight of a polyester, including ≥85-≤99.5, ≥90-≤99.5, or ≥95-≤99.5 parts by weight of the polyester. Preferably, the composition comprises ≥90-≤99.5 parts by weight of the polyester. The composition can also comprise from 95 to 98 parts by weight of the polyester.

Copolyester-ethers suitable for the present disclosure comprise one or more polyester segments and one or more polyether segments. The polyether segments advantageously have a number-average molecular weight of from about ≥200 to about ≤5000 g/mol. In some embodiments, the polyether segments of the copolyester-ether may have a number-average molecular weight of from about ≥600 to about ≤3500 g/mol, and more specifically between about ≥800 to about ≤3000 g/mol, that the copolyester-ether contains one or more polyether segments in an amount of about ≥5 to about ≤60 wt %, in particular about ≥10 to about ≤50 wt. %. In some embodiments, the one or more polyether segments may be present in an amount of about ≥5 to about ≤60 wt % of the copolyester-ether. In other embodiments, the polyether segments may be present in an amount of about ≥10 to about ≤50 wt %, more specifically about ≥15 to about 5≤0 wt %, or in particular about ≥20 to about ≤45 wt %, in all cases based on the copolyester-ether.

In some embodiments, copolyester-ethers suitable for the present disclosure comprise one or more polyether segments in amounts so that the weight ratio of the one or more polyether segments to the total amount of base polyester and polyester segments in the additive composition is about ≥0.2 to about ≤15 wt %, more specifically about ≥0.3 to about ≤10 wt %, or in particular about ≥0.4 to about ≤5 wt %, or about ≥0.5 to about ≤2.5 wt % or about ≥0.8 to about ≤2 wt %.

Advantageously, the polyether segment is a poly ($C_2$-$C_6$-alkylene glycol) segment. The $C_2$-$C_6$-alkylene glycol may be a linear or branched aliphatic $C_2$-$C_6$-moiety. In some embodiments, the polyether segment is a linear or branched poly ($C_2$-$C_6$-alkylene glycol) segment. Specific examples of such copolyester-ethers include poly(ethylene glycol), linear or branched poly(propylene glycol), linear or branched poly(butylene glycol), linear or branched poly(pentylene glycol), linear or branched poly(hexylene glycol) as well as mixed poly ($C_2$-$C_6$-alkylene glycols) obtained from two or more of the glycolic monomers used in preparing the before-mentioned examples. Advantageously, the polyether segment is a linear or branched poly(propylene glycol) or a linear or branched poly(butylene glycol). Compound having three hydroxyl groups (glycerols and linear or branched aliphatic triols could also be used.

The copolyester-ethers suitable for the present disclosure also comprise one or more polyester segments. The type of polyester in these segments is not particularly limited and can be any of the above-referenced polyesters. Advantageously, the copolyester-ether comprises a polyethylene terephthalate (co)polymer segment. Advantageously, the copolyester-ether comprises a polyethylene terephthalate (co)polymer segment and a linear or branched poly(butylene glycol) segment.

Methods of preparing polyethers and copolyester-ethers are well known in the art. For example, the copolyester-ether can be produced by ester interchange with the dialkyl ester of a dicarboxylic acid. In the ester interchange process dialkyl esters of dicarboxylic acids undergo transesterification with one or more glycols in the presence of a catalyst such as zinc acetate as described in WO 2010/096459 A2, incorporated herein by reference. A suitable amount of elemental zinc in the copolyester-ether can be about ≥35 to about ≤100 ppm, for example about ≥40 to about ≤80 ppm, by weight of the copolyester-ether. The poly(alkylene oxide) glycols replace part of these glycols in these transesterification processes. The poly(alkylene oxide) glycols can be added with the starting raw materials or added after transesterification. In either case, the monomer and oligomer mixture can be produced continuously in a series of one or more reactors operating at elevated temperature and pressures at one atmosphere or lesser. Alternatively, the monomer and oligomer mixture can be produced in one or more batch reactors.

Next, the mixture of copolyester-ether monomer and oligomers undergoes melt-phase polycondensation to produce a polymer. The polymer is produced in a series of one or more reactors operating at elevated temperatures. To facilitate removal of excess glycols, water, and other reaction products, the polycondensation reactors are run under a vacuum.

Catalysts for the polycondensation reaction include compounds of antimony, germanium, tin, titanium and/or aluminum. Reaction conditions for polycondensation can include (i) a temperature less than about 290° C., or about 10° C. higher than the melting point of the copolyester-ether; and (ii) a pressure of less than about 0.01 bar, decreasing as polymerization proceeds. This copolyester-ether can be produced continuously in a series of one or more reactors operating at elevated temperature and pressures less than one atmosphere.

Alternatively this copolyester-ether can be produced in one or more batch reactors. The intrinsic viscosity (IV) after melt phase polymerization and/or solid state polymerization can be in the range of about ≥0.4 dL/g to about ≤1.5 dL/g. Antioxidants and other additives can be added before and/or during polymerization to control the degradation of the polyester-ether segments.

Alternatively, the copolyester-ethers can be produced by reactive extrusion of the polyether with the polyester. In the above-described methods of preparing the copolyester-ethers, it may happen that the polyether does not fully react with the polyester but is partly present as an intimate blend of the polyester and polyether. Therefore, throughout the specification and claims, the reference to a copolyester-ether comprising one or more polyester segments and one or more polyether segments is to be understood as referring to the respective copolyester-ethers, blends of respective polyesters and polyethers, and mixtures comprising both the respective copolyester-ethers and blends of the respective polyesters and polyethers.

Where the disclosure may further comprise a transition metal-based oxidation catalyst, suitable oxidation catalysts include those transition metal catalysts that activate or promote the oxidation of the copolyester-ether by ambient oxygen. In an oxidation state other than 0, a transition metal is typically added or present as a salt, oxide, or other counter-ion. In some embodiments, the transition metal-based oxidation catalyst may include, but is not limited to, a transition metal salt of i) a metal comprising at least one member selected from the group consisting of cobalt, manganese, copper, chromium, zinc, iron, and nickel and ii) a counter ion comprising at least one member selected from the group of carboxylate, such as neodecanoates, octanoates, stearates, acetates, naphthalates, lactates, maleates, acetylacetonates, linoleates, oleates, palminates or 2-ethyl hexanoates, oxides, carbonates, chlorides, dioxides, hydroxides, nitrates, phosphates, sulfates, silicates or mixtures thereof.

In some embodiments, the transition metal-based oxidation catalyst is a cobalt compound. In the container- or preform-related embodiments of the present disclosure, it may be advantageous that the transition metal-based oxidation catalyst is a cobalt compound that is present in an amount such that the weight of the cobalt metal in the polymer resin composition for preparing an article, preform or container is at least about 80 ppm by weight, at least about 85 ppm, at least about 90 ppm, at least about 95 ppm, at least about 100 ppm, relative to the total weight of the resin composition.

In some embodiments, the transition metal-based oxidation catalyst is a cobalt compound that is present in an amount such that the weight of the cobalt metal in the polymer resin composition for preparing an article, preform or container is about ≥80 to about ≤1000 ppm, about ≥80 to about ≤800 ppm, about ≥80 to about ≤600 ppm, about ≥90 to about ≤500 ppm, about ≥90 to about ≤400 ppm, about ≥90 to about ≤300 ppm, and more specifically about ≥100 to about ≤250 ppm.

In some embodiments, the transition metal-based oxidation catalyst may be a cobalt salt, in particular a cobalt carboxylate, and especially a cobalt $C_8$-$C_{20}$ carboxylate. The cobalt compound may be physically separate from the copolyester-ether, for example a sheath core or side-by-side relationship, so as not to activate the copolyester-ether prior to melt blending into a container.

It is possible that the transition metal catalyst is incorporated in the polymer matrix during extrusion for example.

The transition metal catalyst can be added during polymerization of the polyester or compounded into a suitable polyester thereby forming a polyester-based masterbatch that can be added during the preparation of the article.

In some embodiments, the weight ratio of the transition metal-based oxidation catalyst to the alkaline earth metal compound in the matsterbatch composition, on the basis of the weight of the transition metal and the alkaline earth metal, is from about ≤50:1 to about 1:≤50. Optionally, the ratio is from about ≤40:1 to about 1:≤40, about ≤35:1 to about 1:≤35, about ≤30:1 to about 1:≤30, about ≤25:1 to about 1:≤25 or about ≤20:1 to about 1:≤20. More preferred the ratio is from about ≤10:1 to about 1:≤10, even more preferred about 1:1 to about 1:≤8 and most preferred about ≥2:1 to about 1:≤6.

In some embodiments, the weight ratio of the alkali metal compound to the alkaline earth metal compound in the matsterbatch composition, on the basis of the weight of the alkali metal and the alkaline earth metal, is from about ≤20:1 to about 1:≤20. Optionally, the ratio is from about ≤15:1 to about 1:≤15, about ≤12:1 to about 1:≤12, about ≤10:1 to about 1:≤10, about ≤8:1 to about 1:≤8, about ≤6:1 to about 1:≤6 or about ≤5:1 to about 1:≤5. More preferred the ratio is from about 1:1 to about 1:≤3.

In some embodiments, the transition metal compound is present in the masterbatch composition in an amount of about ≥5 ppm to about ≤20000 ppm, more specifically, about ≥10 ppm to about ≤15000 ppm, and in particular, about ≥20 ppm to about ≤10000 ppm, more preferred about ≥2000 ppm to about ≤6000 ppm, based on the weight of transition metal in the total masterbatch composition.

In some embodiments the alkali metal compound is present in the masterbatch composition in an amount of about ≥5 ppm to about ≤20000 ppm, more specifically, about ≥10 ppm to about ≤15000 ppm, and in particular, about ≥20 ppm to about ≤10000 ppm, based on the weight of alkali metal in the total masterbatch composition, In some embodiments the alkaline earth metal compound is present in the masterbatch composition in an amount of about ≥5 ppm to about ≤20000 ppm, more specifically, about ≥10 ppm to about ≤15000 ppm, and in particular, about ≥20 ppm to about ≤10000 ppm, based on the weight of alkaline earth metal in the total masterbatch composition.

In some embodiments, the alkaline earth metal compound is a salt with a counter ion that is capable of acting as a Bronstedt base in the composition. Alkaline earth metal compounds having linear, branched or cyclic alkyl chains may be used. In particular, the alkaline earth metal compound may be selected from alkaline earth metal carboxylates, in particular $C_1$-$C_{18}$-carboxylates or $C_8$-$C_{15}$-carboxylates. Examples of $C_1$-$C_{18}$-carboxylates include acetate, propionate, butanoate, pentanoate and hexanoate, octoate, neodecanoate, palmitate, and stearate salts of alkaline earth metal, and mixtures thereof. Examples of $C_8$-$C_{18}$-carboxylates include octoate, neodecanoate, palmitate, and stearate, benzoate and naphthenate salts of alkaline earth metal, and mixtures thereof. Examples of $C_8$-$C_{18}$-carboxylates include octoate, neodecanoate, laurate, myristate, palmitate and stearate, and naphthenate salts of alkaline earth metal, and mixtures thereof. It is preferable to use magnesium as the alkaline earth metal, in which case magnesium acetate or magnesium stearate is the preferred alkaline earth metal compound. Preferably, the alkaline earth metal compound is magnesium stearate.

In some embodiments, the magnesium compound may be present in combination with an alkali metal compound with an anion that is capable of acting as a Bronstedt base in the masterbatch composition. Alkali metal compounds having linear, branched or cyclic alkyl chains may be used. In particular, the alkali metal compound may be selected from alkali metal carboxylates, in particular $C_1$-$C_{18}$-carboxylates or $C_1$-$C_4$-carboxylates. Examples of such $C_1$-$C_{18}$-carboxylates include acetate, propionate, butanoate, pentanoate, hexanoate, octoate, neodecanoate, laurate, myristate, palmitate, stearate, benzoate and naphthenate salts of alkali metal, and mixtures thereof. Examples of such $C_1$-$C_4$-carboxylates include fomate, acetate, propionate, and butanate, and mixtures thereof. It is preferable to use sodium as the alkali metal, in which case, either sodium acetate or sodium stearate is the preferred alkali metal compound. It is observed that the additional presence of alkali metal improves the IV of the masterbatch composition to more closely match that of the polyester base resin.

The term "colorant", as used herein, is defined as an organic or inorganic chemical compound that is capable of imparting coloration to a substance, including masking, balancing or countering the absorbance of a substance in the 300-600 nm wavelength. It may be possible to use colorants such as inorganic pigments, for example, iron oxide, titanium oxide and Prussian Blue, and organic colorants such as alizarin colorants, azo colorants and metal phthalocyanine colorants, and trace nutrients such as salts of iron, manganese, boron, copper, cobalt, molybdenum and zinc. It may be advantageous for the colorants to have good thermal and chemical stability.

In some embodiments, the colorant may comprise of industrial, commercial and developmental class of pigments, dyes, inks, paint, and combinations thereof. In other embodiments, the colorant may comprise of synthetic, natural, bio-derived compounds and combinations thereof. In some other embodiments, the colorant may comprise of chemical compounds from a class of hetero-aromatic compounds.

In some embodiments, the colorant may comprise of an organic pigment or color dye. In other embodiments, the colorant may be chosen from a class of dyes, including organic polymer soluble dyes. In some other embodiments, the colorant may be a yellow dye, red dye, blue dye, and combinations thereof. In certain embodiments, the colorant may comprise a substituted Hydroxyquinolin-indene-dione nucleus substituted in such a way as to produce an absorption range in the yellow part of the visible spectrum (~420-430 nm wavelength).

Examples of colorants may include, but not limited to, one or more dyes selected from the group consisting of Solvaperm Blue B, Solvaperm Green G, Polysynthren Yellow GG, Polysynthren Violet G, Polysynthren Blue R, Solvaperm Yellow 2G, Solvaperm Orange G, Solvaperm Red G, Solvaperm Red GG, Solvaperm Red Violet R, PV Fast Red E5B 02, PV Fast Pink E, PV Fast Blue A2R, PV Fast Blue B2G 01, PV Fast Green GNX, PV Fast Yellow HG, PV Fast Yellow HGR, PV Fast Yellow H3R, PV Red HG VP 2178, Polysynthren Brown R, Hostasol Yellow 3G, Hostasol Red GG, Hostasol Red 5B.

Suitable examples of the colorant include, but are not limited to, polysynthrene Blue RLS (CAS No. 23552-74-1), Macrolex Red 5B (CAS No. 81-39-0), Solvaperm Yellow 2G (CAS No. 7576-65-0), and examples thereof.

In certain embodiments, the colorant is selected from group consisting of a yellow dye, red dye and blue dye. In a further embodiment, the colorant is a yellow dye. A non-limiting example of a yellow dye is Solvaperm Yellow 2G.

In some embodiments, the polyether segments in the copolyester-ether have a number-average molecular weight of from about $\geq 600$ to about $\leq 3500$ g/mol, in particular about $\geq 800$ to about $\leq 3000$ g/mol, the polyether segment is a linear or branched poly ($C_2$-$C_6$-alkylene glycol) segment, the transition metal-based oxidation catalyst is a cobalt compound, the sodium compound is present in an amount of about $\geq 25$ to about $\leq 6000$ ppm, on basis of the weight of the sodium in the total resin composition.

In some embodiments the magnesium compound is present in an amount of about $\geq 25$ to about $\leq 6000$ ppm, on basis of the weight of the magnesium in the total resin composition In some embodiments, the transition metal based oxidation catalyst is present in an amount of about $\geq 1$ to about $\leq 10000$ ppm, on basis of the weight of the transition metal in the total resin composition.

In the masterbatch embodiments of the present disclosure, it may be advantageous that the polyester is a polyethylene terephthalate (co)polyester, Furthermore it may be advantageous that the transition metal-based oxidation catalyst is a cobalt catalyst. Preferably then the oxidation catalyst is present in an amount of $\geq 5$-$\leq 20000$ ppm, on basis of the weight of cobalt in the total masterbatch, Furthermore it may be advantageous that a magnesium compound is present. In this case it is especially preferred that the weight ratio of the cobalt catalyst to the magnesium compound, on basis of the weight of the cobalt and the magnesium, is from $\leq 50:1$ to $1:\leq 50$ Furthermore it may be advantageous that a sodium compound is present. In this case it is especially preferred that the weight ratio of the sodium to the magnesium compound, on basis of the weight of the sodium and the magnesium, is from $\leq 20:1$ to $1:\leq 20$.

In further masterbatch embodiments of the present disclosure, it may be advantageous that a magnesium $C_1$-$C_{18}$-carboxylate, in particular a $C_8$-$C_{18}$-carboxylate, is present. In these cases it is especially preferred that the weight ratio of the cobalt catalyst to the magnesium compound, on basis of the weight of the cobalt and the magnesium, is from $\leq 50:1$ to $1:\leq 50$.

Furthermore it may be advantageous that a sodium $C_1$-$C_{18}$-carboxylate, in particular a $C_8$-$C_{18}$-carboxylate, is present. In this cases it is especially preferred that the weight ratio of the sodium to the magnesium compound, on basis of the weight of the sodium and the magnesium, is from $\leq 20:1$ to $1:\leq 20$.

Embodiments in some aspects of the disclosure may further comprise additives selected from the group consisting of dyes, pigments, fillers, branching agents, reheat agents, anti-blocking agents, anti-static agents, biocides, blowing agents, coupling agents, antifoaming agents, flame retardants, heat stabilizers, impact modifiers, crystallization aids, lubricants, plasticizers, processing aids, buffers, and slip agents. Representative examples of such additives are well-known to the skilled person.

It may be advantageous that an ionic compatibilizer is present or used. Suitable ionic compatibilizers can for instance be copolyesters prepared by using ionic monomer units as disclosed in WO 2011/031929 A2, page 5, incorporated herein by reference.

The disclosed compositions, masterbatches and methods may be used for preparing various articles of manufacture. Suitable articles include, but are not limited to, film, sheet, tubing, pipes, fiber, container preforms, blow molded articles such as rigid containers, thermoformed articles, flexible bags and the like and combinations thereof. Typical rigid or semi-rigid articles can be formed from plastic, paper or cardboard cartons or bottles such as juice, milk, soft drink, beer and soup containers, thermoformed trays or cups. In addition, the walls of such articles may comprise multiple layers of materials.

The disclosure is further illustrated by the following examples, although it will be understood that these examples are included for the purposes of illustration only and are not intended to limit the scope of the disclosure.

The term "comprising" encompasses "including" as well as "consisting" e.g. a composition "comprising" X may consist exclusively of X or may include something additional e.g. X+Y.

The reference to "base polyester", "base polymer" or "base resin" characterizes that the polyester, polymer or resin constitutes the predominant component, i.e. more than 50 wt.-% of the entire composition.

Test Procedures

Number Average Molecular Weight

The number average molecular weight of the polyols is determined by the titration method for the hydroxyl number of the polyols. Similar ASTM methods are ASTM E222A and ASTM E222B, herein incorporated by reference.

A polyol sample is added into a 100 mL beaker 15 mL of dry tetrahydrofuran and the sample dissolved using a magnetic stirrer. 10 mL of p-toluenesulfonyl isocyanate in 250 mL anhydrous acetonitrile is then added to the solution. The solution is then stirred for five minutes after 1 mL of water is added. Then the solution is diluted to 60 mL with tetrahydrofuran and titrated with 0.1 N tetrabutyl ammonium hydroxide (TBAOH) using an automatic titrator. (TBAOH titrant: 100 mL 1M TBAOH/MeOH in 1000 mL isopropanol. Standardize against potassium biphthalate or benzoic acid standards. Re-standardize every time the electrode is recalibrated.)

The hydroxyl number of the polyol is calculated as followed:

$$\text{Hydroxyl number (OH\#)} = \frac{(V2 - V1) \cdot N \cdot 56.1}{\text{sample weight}}$$

Wherein,
V1=Titrant volume at first equivalence point (low pH)
V2=Titrant volume at second equivalence point (higher pH)
N=Normality of TBAOH
OH# is in the units of mg KOH/g glycol The number molecular weight of the polyol is then calculated as followed:

$$\text{Molecular weight (number average)} = \frac{112200}{\text{Hydroxyl number (OH\#)}} \left[\frac{g}{mol}\right]$$

Wherein, the numerator value of 112200 is calculated as, 56.1 (g/mol KOH M·Wt)×2 (cools OH/mol glycol)× 1000 (mg/g)

Intrinsic Viscosity (IV)

The determination of the intrinsic viscosity is determined on a 0.01 g/mL polymer solution in dichloroacetic acid.

Before dissolution of solid state polymerized material, the chips are pressed in a hydraulic press (pressure: 400 kN at 115° C. for about 1 minute; type: PW40® Weber, Remshalden-Grunbach, Germany). 480 to 500 mg polymer, either amorphous chips or pressed chips, are weighed on an analytical balance (Mettler AT 400®) and dichloroacetic acid is added (via Dosimat® 665 or 776 from Metrohm) in such an amount, that a final polymer concentration of 0.01 g/mL is reached.

The polymer is dissolved under agitation (magnetic stirring bar, thermostat with set point of 65° C.; Variomag Thermomodul 40ST®) at 55° C. (internal temperature) for 2.0 hrs. After complete dissolution of the polymer, the solution is cooled down in an aluminum block for 10 to 15 minutes to 20° C. (thermostat with set point of 15° C.; Variomag Thermomodul 40ST®).

The viscosity measurement is performed with the micro Ubbelohode viscometer from Schott (type 53820/11; Ø: 0.70 mm) in the Schott AVS 500® apparatus. The bath temperature is held at 25.00±0.05° C. (Schott Thermostat CK 101®). First the micro Ubbelohde viscometer is purged 4 times with pure dichloroacetic acid then the pure dichloroacetic acid is equilibrated for 2 minutes. The flow time of the pure solvent is measured 3 times. The solvent is drawn off and the viscometer is purged with the polymer solution 4 times. Before measurement, the polymer solution is equilibrated for 2 minutes and then the flow time of this solution is measured 3 times.

The relative viscosity (RV) is determined by dividing the flow time of the solution by the flow time of the pure solvent. RV is converted to IV using the equation:

IV (dL/g)=[(RV−1)×0.691]+0.063.

Elemental Metal Content

The elemental metal content of the ground polymer samples is measured with an Atom Scan 16 ICP Emission Spectrograph from Spektro. 250 mg of the polymer is dissolved via microwave extraction by adding 2.5 mL sulfuric acid (95-97%) and 1.5 mL nitric acid (65%). The solution is cooled, then 1 mL hydrogen peroxide is added to complete the reaction and the solution is transferred into a 25 mL flask using distilled water. The supernatant liquid is analyzed. Comparison of the atomic emissions from the samples under analysis with those of solutions of known elemental ion concentrations is used to calculate the experimental values of elements retained in the polymer samples.

Oxygen Ingress Measurements—Non-Invasive Oxygen Determination (NIOD)

There are several methods available to determine the oxygen permeation, or transmission, into sealed packages such as bottles. In this case, non-invasive oxygen measurement systems (e.g., supplied by OxySense® and PreSens Precision Sensing) based on a fluorescence quenching method for sealed packages are employed. They consist of an optical system with an oxygen sensor spot (e.g. OxyDot®, which is a metal organic fluorescent dye immobilized in a gas permeable hydrophobic polymer) and a fiber optic reader-pen assembly which contains both a blue LED and photo-detector to measure the fluorescence lifetime characteristics of the oxygen sensor spot (e.g. OxyDot®).

The oxygen measurement technique is based upon the absorption of light in the blue region of the metal organic fluorescent dye of the oxygen sensor spot (e.g., OxyDot®), and fluorescence within the red region of the spectrum. The presence of oxygen quenches the fluorescent light from the dye as well as reducing its lifetime. These changes in the fluorescence emission intensity and lifetime are related to the oxygen partial pressure, and thus they can be calibrated to determine the corresponding oxygen concentration.

The oxygen level within a package such as a bottle can be measured by attaching an oxygen sensor spot (e.g., OxyDot®) inside the package. The oxygen sensor spot is then illuminated with a pulsed blue light from the LED of the fiber optic reader-pen assembly. The incident blue light is first absorbed by the dot and then a red fluorescence light is emitted. The red light is detected by a photo-detector and the characteristic of the fluorescence lifetime is measured. Different lifetime characteristics indicate different levels of oxygen within the package.

Experimental Method with PET Bottle at Ambient Conditions (23° C.)

A PreSens non-invasive and non-destructive oxygen ingress measurement equipment (Fibox 3-trace meter, fiber optic cable and trace oxygen sensor spots) is used to determine the oxygen permeability of the bottle at room temperature (23° C.). For a typical shelf-life test, the trace oxygen sensor spot is first attached onto the inner side wall of a 500 ml transparent PET bottle. The bottle is then filled with deionized and deoxygenated water containing $AgNO_3$ up to a headspace of approx. 20 ml, inside a nitrogen circulation glove box where the oxygen level of the water inside the bottle is stabilized at a level well below 50 ppb. These bottles are then stored in a conditioning cabinet (Binder 23° C., 50% relative humidity) and the oxygen ingresses are monitored as a function of time using the PreSens oxygen ingress measurement equipment.

At a given time of measurements, an average value is first obtained from about 10 readings taken on the output of the trace oxygen spot for each bottle. This is then repeated for all the 5 bottles so as to achieve an overall averaged value for the oxygen ingress through the formulated cap and the wall of the bottle.

Oxygen measurement may be made at any predetermined day count starting from day 0 (start). The average oxygen ingress is determined and reported as ppb as follows:

$$\text{Oxygen ingress }[ppb] = \frac{\sum \text{Oxygen ingress in the measurement of that day }[ppb]}{\sum \text{Amount of measurements up to the day of measurement*}}$$

*Including day 0

Preform and Bottle Process

Unless otherwise stated, the barrier copolyester-ether of the present disclosure is dryed for about 24 hours at 110-120° C. under nitrogen atmosphere, the catalyst masterbatch of the present disclosure is dryed for about 24 hours at 80-90° C. under nitrogen and blended with the dry base resin, melted and extruded into preforms. Each preform for a 0.5 liter soft drink bottle, for example, employed about 28 grams of the resin. The preform is then heated to about 85-120° C. and stretch-blown into a 0.5 liter contour bottle at a planar stretch ratio of approx. 8. The stretch ratio is the stretch in the radial direction times the stretch in the length (axial) direction. Thus if a preform is blown into a bottle, it may be stretched about two times in the axial direction and stretched up to about four times in the hoop direction giving a planar stretch ratio of up to eight (2×4). Since the bottle size is fixed, different preform sizes can be used for obtaining different stretch ratios. The sidewall thickness of the bottles is ≥0.25 mm.

Materials Used in the Examples

Purified terephthalic acid (PTA; Chemical Abstract Registry CAS No. 100-21-0), is used in the examples of the present disclosure. Monoethylene Glycol, EG or MEG (CAS No. 107-21-1), is used in the examples of the present disclosure. The product specification of EG is minimum 99.9% purity by weight.

A titanium catalyst, TI-Catalyst HS06, as used in the examples of the present disclosure, is manufactured by Sachtleben Chemie GmbH (Germany). The titanium content in the catalyst is 44% by weight.

A commercial-grade, INVISTA Terathane® 1400 Poly (tetramethylene ether) Glycol or PTMEG 1400 is used in the examples of the present disclosure. Terathane® 1400 has a number average molecular weight of 1400 g/mole, stabilized with 200-350 ppm BHT (CAS No. 128-37-0).

A commercially available antioxidant, Ethanox® 330 (CAS No. 1709-70-2), is used in the examples of the present disclosure, such as that manufactured by SI Group. Typical commercial purity of Ethanox® 330 is greater than 99% by weight.

An industrial hindered amine light stabilizer HALS, Uvinul® 4050 (CAS No. 124172-53-8), as used in the examples of the present disclosure, is manufactured by BASF. Uvinul® 4050, i.e., N,N'-bisformyl-N,N'-bis-(2,2,6,6-tetramethyl-4-piperidinyl)-hexamethylendiamine, is a sterically hindered monomeric amine with the molecular mass of 450 g/gmol.

Cobalt stearate (CAS No. 1002-88-6), as used in the examples of the present disclosure, is manufactured and supplied by OM Group under the "Manobond CS95" product name. The cobalt content in Manobond CS95 is 9.3-9.8% by weight and the melt point of Manobond CS95 is in the range of 80 to 95° C.

Sodium stearate (CAS No. 68424-38-4), as used in the examples of the present disclosure, is supplied by Peter Greven GmbH & Co. KG, Germany, under the "Ligastar NA R/D" product trade name. The sodium content in Ligastar NA R/D is about 6% by weight.

Pharmaceutical grade sodium acetate, as used in the examples of the present disclosure, is manufactured and supplied by Niacet b.v., The Netherlands. The moisture content in sodium acetate is 0.5 wt % (max).

Magnesium stearate (CAS No. 557-04-0), as used in the examples of the present disclosure, is supplied by Peter Greven GmbH & Co. KG, Germany, under the "Ligastar MG 700" product trade name. The magnesium content in Ligastar MG 700 is about 4.4% by weight.

Solvaperm Yellow 2G (CAS No. 7576-65-0) with the color index of Solvent Yellow 114, as used in the examples of the present disclosure, is a registered product trademark of Clariant Chemicals.

An INVISTA Polymer and Resins product brand, Polyclear® PET 1101, as used in the examples of the present disclosure, is a commercial grade copolymer packaging resin with a nominal intrinsic viscosity (IV) of 0.83±0.02 dL/g (measured as 1% solution in dichloroacetic acid) and contains isophthalic acid (IPA). This grade is typically used in carbonated soft drink (CSD) bottles, packaging and other injection/stretch-blow molded applications.

EXAMPLES

Example 1—Copolyester-Ether (COPE) Preparation

The base resin, copolyester-ether (COPE) is prepared using continuous polymerization process: Direct esterification of terephthalic acid (PTA) and monoethylene glycol (EG) in a small molar excess of glycol (about 1.10:1 EG:PTA molar ratio) is performed in a primary esterification reactor at 250-260° C. and under normal pressure in the presence of titanium catalyst C94. Terathane® PTMEG 1400, at about 35 wt % based on the final copolyester-ether polymer weight, is added after esterification and the mixture is stirred for about 1 hour. Uvinul® 4050 is added late to the esterification reaction mixture and shortly before the start of polycondensation.

During the polycondensation step, the elimination of glycol under reduced pressure is started with the final polycondensation temperature in the 255-260° C. range. The final polycondensation pressure is about 1 mbar. Excess glycol is distilled out of the reaction mixture under increased temperature and reduced pressure until the desired polymerization degree is achieved. The desired polymer melt is flowed through the reactor discharge pump in a cooling bath with deionized water. After the polymer strand is cooled underwater, it is pelletized with Pell-tec pelletizer.

The intrinsic viscosity of the final copolyester-ether polymer compositions is in the 0.600 to 0.850 dL/g range. In one embodiment, a 1000 kg of COPE product may be prepared using following component quantities as listed in Table 1.

TABLE 1

| Component | Amount, kg |
|---|---|
| Terephthalic Acid | 562 |
| Ethylene Glycol | 231 |
| Terathane ® 1400 | 350 |
| Uvinul ® 4050 | 2.0 |
| Ethanox ® 330 | 0.50 |
| Catalyst - C94 | 0.350 |
| Anti-foam agent | <0.5 |

Example 2—Cobalt-Stearate Masterbatch (Co-MB) Preparation

A PTA-based polymer, as used herein, is a commercial polyethylene terephthalate (PET) polyester product of INVISTA Resins and Fibers with the "XPURE® Polyester 7090" product name. The XPURE® Polyester 7090 is prepared according to the similar direct esterification method described in Example 1. The PET polymer resin is dried at 150-160° C. under vacuum for 4-6 hours with dry air (<−30° C. dew point) to attain 50 ppm (max.) residual moisture content.

Cobalt stearate, sodium stearate (or sodium acetate), magnesium stearate, and suitable colorant dye are added directly in the melt extrusion step. The melt extruder used is a co-rotating, 27 mm extruder screw diameter and screw length to diameter (L:D) ratio of 36:1, for example, Leistritz Micro 27 36D model melt extruder. The polymer processing rate is about 8 kg/hr. Stage-wise operating temperatures are: water at room temperature ($T_0$), 230° C. ($T_1$), 254° C. ($T_2$), 256° C. ($T_3$), 253° C. ($T_4$-$T_5$), 255° C. ($T_6$-$T_7$) and 260° C. ($T_8$-$T_9$). The desired molten material is extruded into a cooling water bath with deionized water. The cooled polymer strands are pelletized with Pell-tee pelletizer into typical cylindrical granules of about 2 mm diameter and about 3 mm length.

The individual metal content in the final Cobalt-Stearate Masterbatch (Co-MB) composition may be varied by adjusting the respective metal additives. Examples 3 (a-e) represent various metals and levels in the Co-MB preparations according to the present disclosure.

Examples 3 (a-e)—Cobalt-Stearate Masterbatch (Co-MB) with Different Metals

The Co-MB compositions of Examples 3 are prepared according to the method described in Example 2. Individual metal compounds are added to the composition to obtain various metal levels in the final composition. Table 2 below represents the Co-MB compositions prepared according to the present disclosure. Table 2 also gives the measured intrinsic viscosity (IV) data for the prepared final Co-MB compositions comprising varying metals content in ppm by weight, measured relative to the final Co-MB composition.

TABLE 2

| Run | Metal Compound used | Co [ppm] | Metal [ppm] | IV [dL/g] | Na/Mg wt/wt | Co/Mg wt/wt |
|---|---|---|---|---|---|---|
| Comparative (a) | Cobalt Stearate | 2166 | | 0.372 | Not applicable | Not applicable |
| | — | | 0.0 Mg | | | |
| | — | | 0.0 Na | | | |
| Comparative (b) | Cobalt Stearate | 2374 | | 0.340 | 0.0 | 4.16 |
| | Magnesium Stearate | | 570 Mg | | | |
| | — | | 0.0 Na | | | |
| (c) | Cobalt Stearate | 2103 | | 0.451 | 1.89 | 3.91 |
| | Magnesium Stearate | | 538 Mg | | | |
| | Sodium Stearate | | 1017 Na | | | |
| (d) | Cobalt Stearate | 2175 | | 0.446 | 1.37 | 4.26 |
| | Magnesium Stearate | | 511 Mg | | | |
| | Sodium Acetate | | 698 Na | | | |
| (e) | Cobalt Stearate | 4290 | | 0.505 | 1.73 | 4.02 |
| | Magnesium Stearate | | 1068 Mg | | | |
| | Sodium Stearate | | 1848 Na | | | |

In Table 2, the cobalt metal level is maintained to about 2250150 ppm by weight, except in Example 3(e) where the cobalt metal level is almost doubled to 4290 ppm by weight, relative to the final Co-MB composition. The individual Mg and Na levels are varied by adjusting the individual metal compounds in the Co-MB preparation.

In Comparative Example 3(a), the measured IV value for the Co-MB composition is undesirably low, i.e., less than 0.40 dL/g, and creates processing problems downstream. The addition of magnesium alone at about 570 ppm level in Comparative Example 3(b) does not improve the IV of final Co-MB composition. In Examples 3(c), 3(d) and 3(e), the measured IV values show unexpected improvements for the tested metal combinations and their levels.

In Example 3(e), we observe a significant IV improvement even at high cobalt levels in the final Co-MB composition. This is surprising for higher cobalt levels as the moisture content in the cobalt metal compound would be expected to reduce the IV. The particular combination of the metals, i.e., cobalt, magnesium and sodium, as in the case of Example 3(e), unexpectedly produces the Co-MB composition having desirable viscosity characteristics.

Example 4

A Co-MB composition is prepared according to the present disclosure and method described in Example 2. In one embodiment, a 1000 kg of Co-MB product may be prepared using the following components quantities as listed in Table 3.

TABLE 3

| Component | Amount, kg |
|---|---|
| XPURE ® Polyester 7090 | 907.2 |
| Cobalt Stearate | 42.9 |
| Sodium Stearate | 26.0 |
| Magnesium Stearate | 23.9 |
| Solvaperm Yellow 2G | 0.06 |

For the final Co-MB composition prepared according to Example 4, the Na/Mg (wt/wt) metal ratio is calculated to be about 1.45 and the Co/Mg (wt/wt) metal ratio is calculated to be about 3.64.

The intrinsic viscosity of the final Co-MB polymer composition, prepared according to Example 4, is greater than 0.45 dL/g. The sodium, magnesium and cobalt metal levels in the final Co-MB composition of Example 4 are calculated to be about 1560 ppm, about 1052 ppm and about 4032 ppm by weight, respectively. Individual metal ppm values are relative to the final Co-MB composition prepared according to Example 4.

Example 5—Mixing of COPE and Co-MB Masterbatch

The white or off-white "salt" pellets of COPE, prepared according to the Example 1 method, are mixed with the dark "pepper" pellets of Co-MB, prepared according to the Example 4 method, to form a two-chip component mixture referred to as "salt and pepper" mixture. Prior to mixing the two, both COPE and Co-MB pellets are dried at about 85° C. under vacuum for about 8 hours to remove residual moisture. The salt and pepper mixture may be mixed with the additional dye colorant and/or metal compound depending on the final metal and dye levels to be achieved.

Example 6—Preforms/Bottles

A base "Polyclear® PET 1101" resin is mixed with a "salt and pepper" composition of COPE and Co-MB, prepared according to Example 5, along with the additional dye colorant and/or metal compound depending on the final metal and dye levels to be achieved. A typical composition comprises about 93% by weight of the base resin and about 3.5% by weight for each of COPE and Co-MB portions.

The base resin (PET 1101), COPE and Co-MB weight portions, used relative to the final composition, are injection-molded into preforms and further stretch-blow molded into 500 mL, 28 g bottles.

The bottles so-formed in Example 6 are observed to be clear with no haze and provide acceptable oxygen barrier protection for the filled material inside.

While the illustrative embodiments of the disclosure have been described with particularity, it will be understood that various other modifications will be apparent to and may be readily made by those skilled in the art without departing from the spirit and scope of the disclosure. Accordingly, it is not intended that the scope of the claims hereof be limited to the examples and descriptions set forth herein but rather that the claims be construed as encompassing all the features of patentable novelty which reside in the present disclosure, including all features which would be treated as equivalents thereof by those skilled in the art to which the disclosure pertains.

What is claimed is:

1. A composition for blow-molding articles comprising:
a) ≥80-99.5 parts by weight of polyester;
b) a copolyester-ether, wherein the copolyester-ether comprises one or more polyether segments having a number-average molecular weight of between 200 to 5000 g/mol;
c) a transition metal-based oxidation catalyst, wherein the transition metal is selected from the group consisting of cobalt, manganese, copper, chromium, zinc, iron or nickel, and wherein the transition metal based oxidation catalyst is present in an amount of ≥2000 to <6000 ppm, on basis of the weight of the transition metal in the composition;
d) an alkali metal compound, and
e) an alkaline earth metal compound;
wherein the weight ratio of the transition metal-based oxidation catalyst to the alkaline earth metal compound, of the weight of the transition metal and the alkaline earth metal, is from 50:1 to 1:50, and the weight ratio of the alkali metal compound to the alkaline earth metal compound, on basis of the weight of the alkali metal and the alkaline earth metal, is from 20:1 to 1:20; and wherein the intrinsic viscosity of said composition is at least 0.4 dL/g.

2. The composition of claim 1, wherein the alkaline earth metal compound d) is selected from the group consisting of beryllium (Be), magnesium (Mg), calcium (Ca), strontium (Sr), barium (Ba) or radium (Ra), and wherein the weight ratio of the transition metal-based oxidation catalyst to the alkaline earth metal compound, on basis of the weight of the transition metal and the alkaline earth metal, is from 50:1 to 1:50.

3. The composition of claim 1, wherein the amount of alkaline earth metal in the composition is less than the amount of the transition metal of the transition metal based oxidation catalyst in the composition.

4. The composition of claim 1, wherein the alkaline earth metal compound is a salt with a counter ion that is capable of acting as a Bronstedt base in the composition.

5. The composition of claim 4, wherein the alkaline earth metal compound is selected from C1-C18-carboxylates or C8-C18-carboxylates.

6. The composition of claim 5, wherein the alkaline earth metal compound is a magnesium compound.

7. The composition of claim 6, wherein the magnesium compound is magnesium stearate.

8. The composition of claim 1, wherein transition metal-based oxidation catalyst is a cobalt compound.

9. The composition of claim 1, wherein the alkali metal compound c) is selected from the group consisting of lithium (Li), sodium (Na), potassium (K), rubidium (Rb), cesium (Cs) or francium (Fr), and wherein the weight ratio of the alkali metal compound to the alkaline earth metal compound, on basis of the weight of the alkali metal and the alkaline earth metal, is from 20:1 to 1:20.

10. The composition of claim 1, wherein the alkali metal compound is a salt with a counter ion that is capable of acting as a Bronstedt base in the composition.

11. The composition of claim 10, wherein the alkali metal compound is selected from alkali metal carboxylates, in particular C1-C18-carboxylates or C8-C18-carboxylates.

12. The composition of claim 11, wherein the alkali metal compound is a sodium compound.

13. The composition of claim 12, wherein the sodium compound is sodium stearate or sodium acetate.

14. The composition of claim 1, wherein the composition comprises the components a), b), c) d) and e), and optionally one or more additives selected from the group consisting of dyes, pigments, fillers, branching agents, reheat agents, anti-blocking agents, anti-static agents, biocides, blowing agents, coupling agents, antifoaming agents, flame retardants, heat stabilizers, impact modifiers, crystallization aids, lubricants, plasticizers, processing aids, buffers, and slip agents.

15. A composition for blow-molding articles comprising:
   a) ≥80-99.5 parts by weight of polyester;
   b) a copolyester-ether, wherein the copolyester-ether comprises one or more polyether segments having a number-average molecular weight of between 200 to 5000 g/mol;
   c) ≥2000 to ≤6000 ppm cobalt stearate, on basis of the weight of the transition metal in the composition;
   d) magnesium stearate; and
   e) sodium stearate;

wherein the intrinsic viscosity of said composition is at least 0.4 dL/g.

* * * * *

UNITED STATES PATENT AND TRADEMARK OFFICE
CERTIFICATE OF CORRECTION

PATENT NO. : 10,428,199 B2
APPLICATION NO. : 15/506547
DATED : October 1, 2019
INVENTOR(S) : Bayer Page 1 of 1

It is certified that error appears in the above-identified patent and that said Letters Patent is hereby corrected as shown below:

On the Title Page

Item (54) and in the Specification, Column 1, Lines 1:
Change "POLYESTER-ETHER RESIN BLENDS" to IMPROVED POLYESTER-ETHER RESIN BLENDS Signed and Sealed this
Twelfth Day of November, 2019

Andrei Iancu
*Director of the United States Patent and Trademark Office*